INVENTORS
Raymond Jones Wigginton &
James Leighton
BY
*Holcombe, Wetherill & Brisebois*
ATTORNEYS

3,073,712
MANUFACTURE OF TITANIUM DIOXIDE

Raymond Jones Wigginton, Grimsby, and James Leighton, Luton, England, assignors to Laporte Titanium Limited, London, England, a British company
Filed Aug. 5, 1960, Ser. No. 47,590
Claims priority, application Great Britain Aug. 19, 1959
7 Claims. (Cl. 106—300)

This invention relates to a process for the manufacture of titanium dioxide by reacting a titanium tetrahalide vapour with oxygen or a gas containing oxygen.

The invention provides a process for the manufacture of titanium dioxide which comprises introducing a titanium tetrahalide vapour (excluding the tetrafluoride) and an excess of oxygen or a gas containing oxygen into a bed of particles of a refractory material substantially free from aluminium oxide, which bed is maintained in a fluidised condition at a temperature within the range of from 750° C. to 1,500° C., to oxidise the titanium tetrachloride to titanium dioxide of which a part is retained in the bed and the remainder is entrained in the gas stream leaving the bed, and incorporating aluminium oxide with the entrained titanium dioxide by incorporating aluminium chloride vapour with the gas stream after it has left the bed and before it cools to a temperature below 600° C., the quantity of oxygen, or gas containing oxygen, in the gas stream being at least sufficient to convert the aluminium chloride into aluminium oxide and the rate of introduction of the aluminium chloride being within the range of from 0.5 to 5.0% by weight calculated as aluminium oxide and based on the rate of production of the entrained titanium dioxide.

The entrained titanium dioxide has pigmentary properties, which are improved by the incorporation with it of the aluminium oxide, and synthetic paint finishes and synthetic plastic laminates incorporating such titanium dioxide have improved anti-yellowing and light stability characteristics. The retained titanium dioxide, on the other hand, has no pigmentary properties, but it is hard, dense and chemically pure and is suitable for many purposes including the manufacture of ceramic materials for use as dielectrics, for which purpose it is important that the retained titanium dioxide should be substantially free from aluminium oxide.

Thus in a single process the present invention provides for the formation of two grades of titanium dioxide: a pigmentary grade and a non-pigmentary grade.

The titanium dioxide of pigmentary grade is withdrawn from the fluidised bed entrained in the gas stream, and the titanium dioxide of non-pigmentary grade is withdrawn from the fluidized bed directly. Although the two grades have basically different properties, they are both extremely useful products, and the method of the present invention allows both to be fully utilized.

The formation of two useful products is made possible by incorporating the aluminum chloride with the entrained titanium dioxide after the entrained titanium dioxide has left the fluidised bed.

In this way it is possible to maintain the fluidised bed and the retained titanium dioxide free from aluminum oxide, and to obtain pigmentary grade titanium dioxide improved by the presence of aluminum oxide. Surprisingly it is found that the pigmentary grade titanium dioxide in which aluminum oxide has been incorporated after the formation of the titanium dioxide is of a quality equal to that of pigmentary grade titanium dioxide in which aluminum has been incorporated during formation of titanium dioxide.

The relative proportions of retained and entrained titanium dioxide produced depend upon the operating conditions and can be varied over a wide range by altering the operating conditions of which the most important is the space velocity of the fluidising gas (the volume of fluidising gas flowing through the bed in unit time divided by the volume occupied by the bed). For example, increasing or decreasing the space velocity of the fluidising gas decreases or increases respectively the proportion of retained titanium dioxide. Also, increasing the depth of the bed increases the proportion of retained titanium dioxide.

Substantially the whole of the retained titanium dioxide is in the form of a deposit on the particles forming the bed, and is not in the form of additional particles. Thus the mean size of the particles forming the bed tends to increase and, advantageously, the size distribution of the particles forming the bed is controlled by gradually introducing directly into the bed from an outside source fluidisable particles of titanium dioxide and gradually withdrawing particles from the bed, the mean size of the added particles being smaller than the mean size of the particles withdrawn. It is important that the added particles should be introduced directly into the bed rather than being allowed to drop into the bed through the gas stream because that might lead to the added particles becoming contaminated with aluminium oxide.

The aluminium chloride vapour is advantageously prepared by a process which comprises maintaining a bed consisting substantially of aluminium particles in a fluidised condition by passing an inert gas upwardly through the bed, and separately introducing into the fluidised bed so produced chlorine or a mixture of chlorine and an inert gas, the chlorine or chlorine-containing gas being introduced through one or more inlets at a linear velocity equal to at least 10 times the linear velocity at which the inert fluidising gas flows through the bed (neglecting the presence of the particles making up the bed), the temperature within the fluidised bed being maintained within the range of from 100 to 600° C., the total rate of introduction of inert gas into the fluidised bed being at least twice the rate of introduction of chlorine into the fluidised bed on a volume basis, and the said inlet or inlets being so situated and arranged that during a period of 30 minutes of continuous operation, no substantial blocking of the said inlet or inlets occurs. This process enables aluminium chloride to be produced at a controlled rate, which makes it especially suitable for providing aluminium chloride to be used for treating pigmentary titanium dioxide. Aluminium chloride produced in this way is of course in vapour form, but, if it cools too far before it meets the gas stream containing the entrained titanium dioxide particles, it will solidify to form a smoke of very fine particles. It is of no significance, however, if the aluminium chloride meets the gas stream in the form of such a smoke rather than in the form of a vapour because the high temperature of the gas stream causes any small particles of aluminium chloride to sublime immediately so that the aluminium chloride is incorporated with the gas stream as a vapour.

The fluidised bed is advantageously maintained at a temperature of at least 900° C. and the aluminium chloride is then advantageously introduced into the gas stream leaving the fluidised bed before the gas stream cools to a temperature below 800° C. The aluminium chloride is preferably introduced into the reaction vessel in which the fluidised bed is contained at a height of not less than 4 inches above the level of the top of the fluidised bed. The detention time of the aluminium within the reactor should of course be sufficiently long to ensure complete oxidation of the aluminium chloride, but it is important that the detention time of the entrained titanium dioxide particles within the reactor should not be so long as to cause undesirable growth of those particles. It is usually possible to satisfy both these conditions by arranging that the detention time of the aluminium within the reactor is rather less than 1 second.

It is possible that there may be some reaction between the aluminium chloride and the hot titanium dioxide particles suspended in the gas stream. Thus, the aluminum chloride may react with the titanium dioxide to form alumina and titanium tetrachloride, but any titanium tetrachloride so formed would immediately be oxidised to titanium dioxide by the oxygen or gas containing oxygen present in the gas stream.

The gas containing oxygen may be a mixture of oxygen with other gases, for example, air, or a gaseous compound containing oxygen, for example, an oxide of nitrogen, or a mixture of one or more such gaseous compounds with one or more other gases of which one might be oxygen.

The reaction between the titanium tetrahalide and the oxygen or gas containing oxygen is exothermic, but, if the reactor is below a certain size, it may be necessary to supply heat in order to maintain the temperature of the fluidised bed within the desired range. This may be done by introducing carbon monoxide into the fluidised bed and ensuring that there is sufficient excess of the oxygen or gas containing oxygen to react with the carbon monoxide. There is then advantageously incorporated with the carbon monoxide a diluent gas being one, or a mixture of more than one, of nitrogen, chlorine and carbon dioxide, the quantities of carbon monoxide and diluent gas being such that the proportion of diluent gas by volume and based on the total volume of carbon monoxide and diluent gas lies within the range of from 11 to 65%. The incorporation of a diluent gas with the carbon monoxide reduces any tendency which there might otherwise be for the reaction vessel to become blocked.

As is known in connection with the manufacture of titanium dioxide by reacting a titanium tetrahalide vapour with oxygen or a gas containing oxygen, small quantities of moisture can be introduced into the reaction zone in order to promote the oxidation reaction by forming small nuclei of hydrolysed titanium dioxide particles. The moisture is preferably introduced with the oxygen or gas containing oxygen.

The gas stream having entrained in it pigmentary titanium dioxide incorporating aluminium oxide is advantageously cooled by a method which comprises passing the gas through a vessel containing a bed of solid particles so as to fluidise the said solid particles and cooling the fluidised bed so formed by means of a cooled heat transfer surface with which the fluidised bed makes contact. The entrained particles can then be collected from the cooled gas stream in a conventional manner, for example, by electrostatic precipitation. In this case, the pigment particles will very probably still contain a small quantity of absorbed chlorine and possibly even some metal chlorides. At least the major proportion of these substances can either be removed by means of a heat treatment at a temperature of about 600° C. or subjected to a hydrolysis treatment with superheated steam. Alternatively, the partially cooled gas stream containing pigmentary titanium dioxide may be passed through a scrubbing tower or quenching system similar to that used in the conventional method of collecting the fine solids fraction from, for example, a spray drying operation. This gives a water slurry of the pigment which can be suitably neutralised or subjected to one of the well known surface treatment processes.

The titanium tetrahalide vapour may be introduced into the reactor in admixture with an inert gas, for example, nitrogen, and at one or more levels. The titanium tetrahalide vapour or a part thereof, whether in admixture with an inert gas or not, should not usually be introduced into the reactor above a level at which carbon monoxide is being introduced, and should never be introduced into the reactor below the level at which the fluidising oxygen or oxygen containing gas is being introduced.

The following example illustrates the invention:

The oxidation reaction was carried out in a cylindrical reactor as shown in the accompanying drawings in which.

Figures 1, 2:
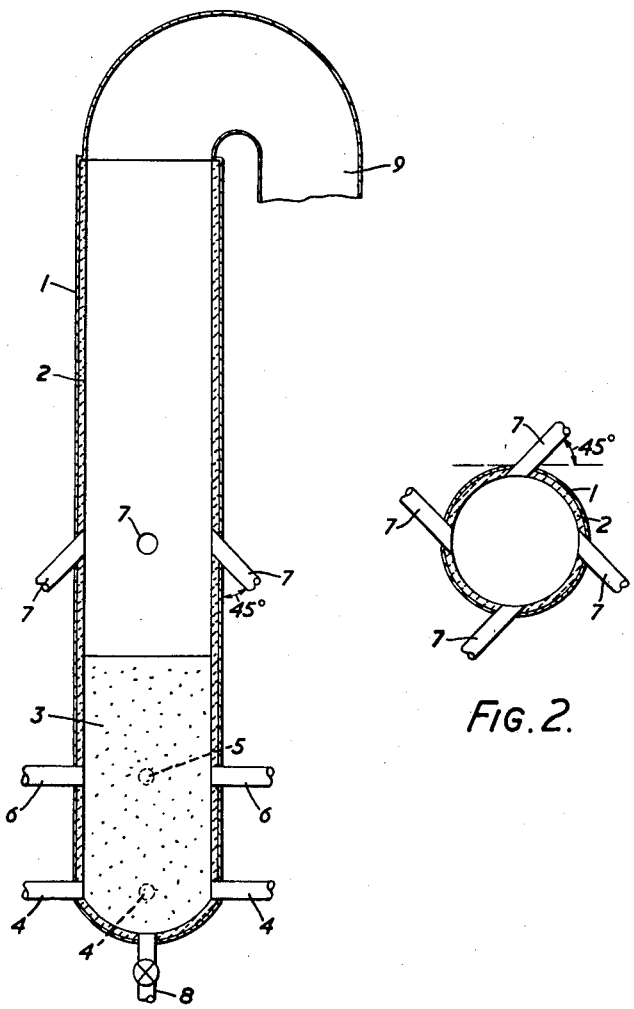
FIG. 1 is a diagrammatic axial section.
FIG. 2 is a horizontal diagrammatic cross-section with the lower gas inlets omitted in the interests of clarity.

The reactor, which was mounted with its axis vertical and had an internal diameter of eight inches and an internal depth of four feet, was formed of an outer steel casing 1 and a refractory lining 2.

Particulate titanium dioxide, which had been obtained from a fluidised bed in which a titanium tetrahalide was reacted with oxygen or a gas containing oxygen in the way referred to above in connection with controlling the size distribution of the particles was introduced into the reactor to form a bed 3 having a static depth of 14 inches. The sieve size distribution (B.S.S.) of the titanium dioxide, which contained substantially no aluminium oxide, was as follows:

|  | Percent |
|---|---|
| +10 mesh | 3 |
| −10 +22 mesh | 5 |
| −22 +44 mesh | 47 |
| −44 +60 mesh | 28 |
| −60 +72 mesh | 8 |
| −72 +100 mesh | 6 |
| −100 mesh | 3 |

The bed of titanium dioxide was fluidised by introducing oxygen into the reactor at a total rate of 418 cubic feet per hour through four horizontally directed inlet ports 4 formed in the side wall of the reaction vessel at a height of two inches above the base of the interior of the reactor.

A mixture of carbon monoxide and nitrogen was introduced into the reactor through an inlet port 5 situated seven inches above the height of the oxygen inlet ports. The rate of feed of carbon monoxide was 180 cubic feet per hour and the rate of feed of nitrogen was 90 cubic feet per hour.

The bed and the reactor were heated to a temperature of 1,200° C. by the combustion of the carbon monoxide and then a mixture of titanium tetrachloride vapour and nitrogen at a temperature of 200° C. was introduced into the reactor through horizontally directed ports 6 situated at the same level as the carbon monoxide inlet port 5. The rate of feed of the titanium tetrachloride vapour was 100 pounds per hour and the rate of feed of the nitrogen introduced in admixture with it was 30 cubic feet per hour.

The depth of the bed when fluidised was approximately 17 inches and aluminium chloride vapour was introduced into the reactor through four inlet pipes 7, the ends of which were open and situated at a height of approximately six inches above the top of the fluidised bed 3. The inlet pipes 7, which were spaced at equal intervals around the reactor, were inclined upwards at an angle of 45° and were each inclined at an angle of 45° to the tangent plane to the vessel at the point of entry of the pipe, the pipes 7 all being inclined to the respective tangent planes in the same sense. The rate of feed of aluminium chloride was 0.8 pound per hour calculated as $Al_2O_3$.

In order to produce the aluminium chloride, there was used a cylindrical stainless steel vessel, which was mounted with its axis vertical and had an internal diameter of 4 inches and a height of 2 feet. The base of the vessel was formed with a gas entry port and a porous gas-distributor plate was fitted a short distance above the base. Passing vertically through the centre of the porous plate and the base of the vessel, there was a capillary tube made of heat-resistant glass and having an internal diameter of 2 millimetres. The upper end portion of the tube was bent through 180° so that the end of the tube, which was open and situated at a height of 5 inches above the porous plate, was directed vertically downwards. An outlet was provided at the top of the vessel and a solids entry port was provided in the side wall of the vessel above the level of the end of the capillary tube. A hopper, which could be pressurised with nitrogen, was connected to this port through a control valve. The vessel was fitted with external gas heating means.

5 pounds of aluminium particles having a size range of −36 +100 mesh (B.S.S.) were introduced into the reaction vessel to form a bed, which was maintained in a fluidised condition by passing nitrogen upwardly through it at a rate of 120 cubic feet per hour, and a mixture of nitrogen and chlorine was introduced into a well-fluidised part of the bed at a high linear velocity, the rate of feed of chlorine being nine cubic feet per hour and the rate of feed of the nitrogen introduced in admixture with the chlorine being ten cubic feet per hour. The depth of the fluidised bed was maintained approximately constant by feeding aluminium to the bed at a rate of 0.43 pound per hour. The reaction temperature was 250° C. Substantially all the chlorine was converted into aluminium chloride, which was fed directly to the oxidation reactor.

The process was operated for several hours and the size distribution of the titanium dioxide particles forming the bed 3 in which the oxidation of the titanium tetrachloride took place was controlled in the following manner. There were fed to the bed in the oxygen stream at hourly intervals charges each consisting of four pounds of titanium dioxide particles having the following sieve size distribution:

|  | Percent |
| --- | --- |
| −44 +60 mesh | 22 |
| −60 +72 mesh | 27 |
| −72 +100 mesh | 43.5 |
| −100 | 7.5 |

The depth of the fluidised bed was kept approximately constant by periodically withdrawing titanium dioxide particles from the bed at an average rate of approximately 10.7 pounds per hour through an outlet 8 situated at the base of the reactor.

Pigmentary grade rutile titanium dioxide containing approximately 2.3% by weight aluminium oxide was carried out of the reaction vessel in suspension in the gas stream at a rate of 35.3 pounds per hour through an outlet 9, and the gaseous suspension was cooled by passing it upwardly through a bed of titanium dioxide particles having sizes in the range of −44 +60 mesh, which were thereby brought into a fluidised condition. This fluidised cooling bed was contained in a vessel having a water jacket through which water was passed to cool the bed. The gaseous suspension entered the vessel containing the fluidised cooling bed at a temperature of 1,000° C. and left the vessel at a temperature of 400° C. The pressure drop across the fluidised cooling bed, which had a depth when fluidised of 12 inches, remained practically constant at 1.0 pound per square inch throughout the period of operation of the process, which indicated that substantially no particles were retained by the bed.

The suspended pigment particles were removed from the cooled gaseous suspension by conventional means using a settling box and glass cloth filter. The filtered chlorine-containing gases were used for the chlorination of titanium ore.

The retained titanium dioxide was found to be substantially free from aluminium oxide. It was of a grey colour and did not differ materially from retained titanium dioxide produced under conditions that were similar except for the fact that no aluminium chloride was introduced into the reaction vessel.

We claim:

1. A process for the simultaneous manufacture of titanium dioxide and titanium dioxide admixed with aluminum oxide, which comprises, introducing a titanium tetrahalide vapour selected from the group consisting of the vapours of titanium tetrachloride, titanium tetrabromide and titanium tetraiodide and an excess of a gas taken from the group consisting of oxygen and gases containing oxygen into a bed of particles of a refractory metallic material substantially free from aluminum oxide, which bed is maintaind in a fluidised condition at a temperature within the range of from 750° C. to 1,500° C., to oxidise the titanium tetrahalide to titanium dioxide of which a part is retained in the bed and removed therefrom to form a product which is suitable for non-pigmentary use, and the remainder of the titanium dioxide is entrained in the gas stream leaving the bed, and incorporating aluminum oxide with the entrained titanium dioxide by incorporating aluminum chloride vapour with the gas stream after it has left the bed and before it cools to a temperature below 600° C., to form an aluminum oxide containing product suitable for pigmentary use, the quantity of said gas taken from the group consisting of oxygen and gases containing oxygen in the gas stream being at least sufficient to convert the aluminum chloride into aluminum oxide and the rate of introduction of the aluminum chloride being within the range of from 0.5 to 5.0% by weight calculated as aluminum oxide and based on the rate of production of the entrained titanium dioxide, and removing the titanium dioxide having incorporated therewith aluminum oxide.

2. A process as claimed in claim 1, wherein the fluidised oxidation bed is maintained at a temperature of at least 900° C. and the aluminium chloride is introduced into the gas stream leaving the fluidised oxidation bed before the gas stream cools to a temperature below 800° C.

3. A process as claimed in claim 1, wherein the aluminium chloride is introduced into the gas stream leaving the fluidised oxidation bed at a height of not less than 4 inches above the level of the top of the fluidised oxidation bed.

4. A process as claimed in claim 1, wherein carbon monoxide is introduced into the fluidised oxidation bed, there is sufficient excess of the gas taken from the group consisting of oxygen and gases containing oxygen to react with the carbon monoxide and the carbon monoxide has incorporated with it before it enters the fluidised oxidation bed a diluent gas selected from the group consisting of nitrogen, chlorine, carbon dioxide and a mixture of more than one of these gases, the quantities of carbon monoxide and diluent gas being such that the proportion of diluent gas by volume and based on the total volume of carbon monoxide and diluent gas lies within the range of from 11 to 65%.

5. A process as claimed in claim 1, wherein the gas stream having entrained in it pigmentary titanium dioxide incorporating aluminium oxide is cooled by passing the gas through a vessel containing a bed of solid particles so as to fluidise the said solid particles and cooling the fluidised bed so formed by means of a cooled heat transfer surface with which the fluidised bed makes contact.

6. A process as claimed in claim 1, wherein the size distribution of the particles forming the bed is controlled by gradually introducing directly into the bed from an outside source fluidisable particles of titanium dioxide and gradually withdrawing particles from the bed, the means size of the added particles being smaller than the means size of the particles withdrawn.

7. A process as claimed in claim 1, wherein the aluminium chloride vapour is prepared by a process which comprises maintaining a bed consisting substantially of aluminium particles in a fluidised condition by passing an inert gas upwardly through the bed, and separately introducing into the fluidised bed so produced a gaseous substance selected from the group consisting of chlorine and a mixture of chlorine and an inert gas, said gaseous substance being introduced through at least one inlet at a linear velocity equal to at least 10 times the linear velocity at which the inert fluidising gas flows through the bed (neglecting the presence of the particles making up the bed), the temperature within the fluidised bed being maintained within the range of from 100 to 600° C., the total rate of introduction of inert gas into the fluidised bed being at least twice the rate of introduction of chlorine into the fluidised bed on a volume basis, and the said inlet being so situated and arranged that, during a period of 30 minutes of continuous operation, no substantial blocking of the said inlet occurs.

References Cited in the file of this patent

UNITED STATES PATENTS

| | | |
|---|---|---|
| 2,020,431 | Osborne et al. | Nov. 12, 1935 |
| 2,689,781 | Schauman | Sept. 21, 1954 |
| 2,760,846 | Richmond et al. | Aug. 28, 1956 |
| 2,760,938 | Dempster et al. | Aug. 28, 1956 |
| 2,790,704 | Lewis | Apr. 30, 1957 |